(12) United States Patent
Varis et al.

(10) Patent No.: US 9,869,320 B2
(45) Date of Patent: Jan. 16, 2018

(54) PROPULSION UNIT

(71) Applicant: ABB Technology AG, Zürich (CH)

(72) Inventors: Jukka Varis, Espoo (FI); Tommi Lempiäinen, Helsinki (FI)

(73) Assignee: ABB Schweiz AG, Baden (CH)

( * ) Notice: Subject to any disclaimer, the term of this patent is extended or adjusted under 35 U.S.C. 154(b) by 408 days.

(21) Appl. No.: 14/288,466

(22) Filed: May 28, 2014

(65) Prior Publication Data

US 2014/0356199 A1 Dec. 4, 2014

(30) Foreign Application Priority Data

May 29, 2013 (EP) .................................... 13169643

(51) Int. Cl.
*F04D 25/06* (2006.01)
*B63H 5/125* (2006.01)
(Continued)

(52) U.S. Cl.
CPC ............. *F04D 25/06* (2013.01); *B63H 5/125* (2013.01); *B63H 23/00* (2013.01); *B63H 23/24* (2013.01);
(Continued)

(58) Field of Classification Search
CPC ........ F04D 13/06; F04D 13/08; F04D 13/086; F04D 25/06; B63H 2023/005;
(Continued)

(56) References Cited

U.S. PATENT DOCUMENTS 5,101,128 A * 3/1992 Veronesi .................. B63H 5/14
290/52
5,522,335 A * 6/1996 Veronesi ................ B63H 5/125
114/151
(Continued)

FOREIGN PATENT DOCUMENTS

CN 101720296 A 6/2010
EP 0111908 A2 6/1984
(Continued)

OTHER PUBLICATIONS

English language translation of Office Action issued on Jan. 27, 2016, by the State Intellectual Property Office of People's of China in corresponding Chinese Patent Application No. 201410230776.2. (9 pages).

(Continued)

*Primary Examiner* — Philip Stimpert
(74) *Attorney, Agent, or Firm* — Taft Stettinius & Hollister LLP

(57) ABSTRACT

A propulsion unit is disclosed, which can include a casing, a shaft, a propeller, an annular housing and a rim drive electric motor. The casing can be rotatably supported at a hull of a vessel. The shaft can be rotatably supported with bearings within a lower portion of the casing. A propeller can be attached to an outer end of the shaft protruding from the lower portion of the casing. The annular housing can surround an outer perimeter of the propeller and can form a duct for water flowing through the interior of the annular housing. The rim drive electric motor can include a rotor rim provided on an outer perimeter of the propeller and a stator provided within the annular housing. Oil lubricated roller bearings can be used on the shaft within the casing. The axial length of the propulsion unit can be short.

7 Claims, 3 Drawing Sheets

(51) Int. Cl.
*B63H 23/00* (2006.01)
*B63H 23/24* (2006.01)

(52) U.S. Cl.
CPC ............... *B63H 2005/1258* (2013.01); *B63H 2023/005* (2013.01); *Y02T 70/5236* (2013.01)

(58) Field of Classification Search
CPC ........ B63H 23/24; B63H 23/00; B63H 5/125; B63H 2005/1258; B63H 5/14; B63H 5/15
USPC ......................................... 417/353, 355, 356
See application file for complete search history.

(56) References Cited

U.S. PATENT DOCUMENTS

| | | | | |
|---|---|---|---|---|
| 6,837,757 | B2* | 1/2005 | Van Dine | B63H 23/24 310/87 |
| 2003/0194922 | A1 | 10/2003 | Van Dine et al. | |
| 2003/0236036 | A1* | 12/2003 | Varis | B63H 5/125 440/6 |
| 2010/0190392 | A1 | 7/2010 | Muller et al. | |
| 2012/0093668 | A1 | 4/2012 | Gleras et al. | |
| 2012/0148424 | A1* | 6/2012 | Hopewell | B63H 23/24 417/356 |

FOREIGN PATENT DOCUMENTS

| | | |
|---|---|---|
| EP | 0 111 908 B1 | 6/1986 |
| FR | 2336297 A1 | 7/1977 |
| JP | S59-160697 A | 9/1984 |
| JP | 10-257752 A | 9/1998 |
| JP | 2007137349 A | 6/2007 |
| KR | 10-2011-0117835 A | 10/2011 |
| WO | WO 99/14113 A1 | 3/1999 |

OTHER PUBLICATIONS

Office Action issued on Jun. 17, 2015, by the Japanese Patent Office in corresponding Japanese Patent Application No. 2014-110460, and an English Translation of the Office Action. (4 pages).
European Search Report mailed on Nov. 14, 2013 for European Application No. 13169643.

\* cited by examiner

PROPULSION UNIT

RELATED APPLICATION(S)

This application claims priority under 35 U.S.C. 119 to European Application No. 13169643.7 filed on May 29, 2013 in Europe, the contents of which are hereby incorporated by reference in its entirety.

FIELD

The present disclosure relates to a propulsion unit.

BACKGROUND INFORMATION

Known propulsion units can include a casing, an electric motor, a shaft, and a propeller. The casing can be rotatably attached to a hull of a vessel. The electric motor can be positioned within the casing. The shaft can pass through the electric motor and can be rotatable supported with bearings within the casing. The propeller can be attached to an outer end of the shaft protruding from the casing. In propulsion units where a high thrust at low speeds is used there can be an annular housing surrounding the perimeter of the propeller. The annular housing can be attached to an upper portion of the casing and to one or several vanes being supported at the casing. The annular housing can form a central duct with an axial flow path for water from a first end to a second end of the annular housing. The thrust produced by the propeller can be amplified by the housing at low speeds. The situation can be such that the propeller can produce 60% of the total thrust and the housing can produce 40% of the total thrust at low speeds. Housings can be used, for example, in Dynamic Positioning (DP) vessels used in oil drilling. Several propulsion units can be used in such vessels and the vessel can be kept steady in position by the propulsion units. For example, a big thrust can be used at low speed to keep the vessel continuously in position in rough seas. In addition, the housing can increase the thrust produced by the propeller at low speeds, for example, at speeds in the order of less than about 15 knots.

WO patent publication 99/14113 discloses one example of a propulsion system including a casing, an electric motor, a shaft, a propeller, and an annular housing surrounding the perimeter of the propeller. The system is intended for vessels moving in ice conditions. The system can include a strut rotatably supported at the hull of the vessel, a torpedo-shaped casing attached to the strut, a drive shaft and an electric motor within the casing, a propeller attached to an outer end portion of the drive shaft, and a nozzle surrounding the propeller. The nozzle can have a water inlet and a water outlet. Rotatable blades or vanes can be attached to an outermost end of the drive shaft outside the water inlet of the nozzle for breaking and/or crushing ice before the ice enters into the nozzle.

In known propulsion units including a casing, an electric motor within the casing and a propeller outside the casing driven by the electric motor, a lack of torque at low speed can exist. The diameter of the electric motor within the casing can be limited and the also the length of the electric motor within the casing can be limited. The housing surrounding the outer perimeter of the propeller can increase the thrust of the arrangement at low speed.

Known propulsion units can be based on rim drive arrangements. A rim drive propulsion unit can include a rotor positioned on the outer periphery of the propeller and a stator positioned within an annular housing surrounding the propeller. The diameter of the rotor and the stator of the electric motor can be increased, wherein the torque of the electric motor can also be increased. The propeller can be attached to a shaft being supported by bearings on both sides of a radial plane passing through the axial middle point of the rotor and the stator. The shaft and the bearings can be within the flow path in the interior of the propulsion unit.

U.S. Patent Application Publication No. 2012/0093668 discloses a rim driven thruster including an annular housing, a propulsion assembly, a magnetic rotor assembly and a stator assembly. The annular housing defines a flow path extending along an axis. A conical forward fairing can be connected to the front end of the housing and a cylindrical aft fairing can be connected to a rearward end of the housing. The propulsion assembly can be supported within the housing and can include propeller blades extending radially from the axis of the flow path. The propeller blades can be configured to rotate about the axis. The magnetic rotor assembly can be mounted to radially outer ends of the propeller blades. The stator assembly can include spaced propeller drive modules mounted to an inner circumferential surface of the annular housing. The propeller drive modules can be configured to provide electromagnetic torque to the magnetic rotor assembly. There can be a shaft extending along the axis in the middle of the annular housing and support brackets at both ends of the annular housing extending in the radial direction from the inner surface of the annular housing towards the axis in the middle of the annular housing. The shaft can be rotatably supported by bearings at both ends to the support brackets.

U.S. Pat. No. 6,837,757 discloses a rim driven propulsion arrangement. The arrangement can include a housing supported by a strut from an adjacent vessel, which can be propelled by the propulsion unit. The housing can form a duct with an axial flow path for water. The inner surface of the duct can be conical at the aft end of the housing. A cylindrical rotor support assembly can be situated centrally within the housing and supported at an aft end by an array of support members in the form of blades at the housing. A rotor assembly can include a hub and radial propeller blades attached to the hub. The hub can be rotatably supported with radial bearings at a central stationary support shaft within the rotor support assembly at a forward end of the rotor support assembly. The axial bearing, for example, the thrust bearing can include a thrust ring rotating with the rotor at the forward end of the hub and a stationary thrust plate affixed to the rotor support assembly. Water can be used as lubrication medium in the thrust bearing.

JP Patent Publication No. 10257752 discloses a drive unit for watercraft. The drive unit can include a central shaft rotatably supported with bearings within a cylindrical casing and an annular housing surrounding the cylindrical casing. A hub can be positioned on the central shaft, the hub having propeller blades attached radially thereto. A coupling unit can be attached to the outer edges of the propeller blades. Several rotor coils can be arranged on the coupling unit. Stator coils can be positioned in the annular housing surrounding the casing. Either the stator coil or the rotor coil can be made of superconducting material and the other coil can be made of conducting material. The propeller and the central shaft can be rotated by supplying current to the stator coil to generate an electromagnetic force between the stator coils and the rotor coils.

Known rim drive propulsion units can have a radial plane passing through the axial middle point of the rotor that coincides with a radial plane passing through the axial middle point situated between the radial bearings of the central shaft.

A rim drive propulsion unit can produce more torque at low speed due to the increase in diameter of the rotor and the stator. The lubrication of the bearings of the shaft supporting the rotor of the rim drive propulsion unit in known units can be based on special arrangements designed for the application. These special arrangements can be based on the use of water as the lubrication medium. Water lubrication, however, can cause corrosion problems and the lubrication properties of water can be limited. Seawater can be corrosive, such that fresh water can be used for lubrication. However, separate fresh water tanks have to be built in the vessel for use of fresh water for lubrication means.

SUMMARY

A propulsion unit is disclosed comprising: a casing including an upper portion and a lower portion, the casing is configured to be rotatably supported from the upper portion at a hull of a vessel; a shaft rotatably supported with radial and axial bearings within the casing, the shaft having an axial center line and an outer end protruding from a first end of the lower portion of the casing; a propeller attached to the outer end of the shaft outside the first end of the lower portion of the casing, and wherein the propeller is configured to rotate with the shaft; an annular housing fixedly supported at the casing, the axial center line of the shaft forming an axial center line of the annular housing, the annular housing surrounding an outer perimeter of the propeller and forming a duct for water to flow through an interior of the annular housing; and a rim drive electric motor including a rotor rim and a stator, the rotor rim being provided on the outer perimeter of the propeller for rotation with the propeller, and wherein the stator is provided within the annular housing and surrounding the rotor rim.

BRIEF DESCRIPTION OF THE DRAWINGS

The disclosure will be described in greater detail by exemplary embodiments with reference to the attached drawings, in which.

DETAILED DESCRIPTION

Figure 1:
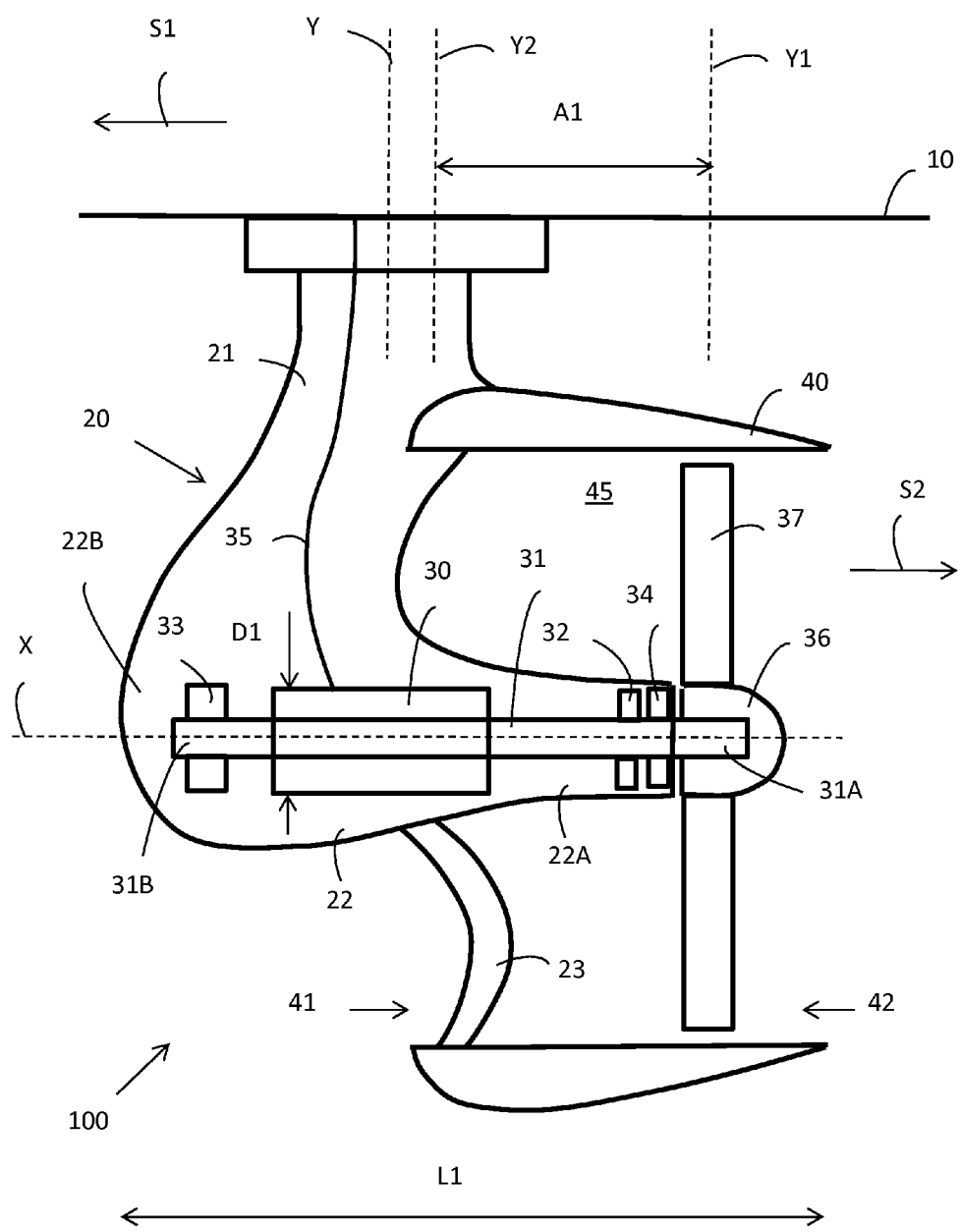
FIG. 1 shows a known propulsion unit.

In accordance with an exemplary embodiment, the propulsion unit can include a casing having an upper portion and a lower portion, the casing being rotatably supported from the upper portion at a hull of a vessel, and a shaft being rotatably supported with radial and axial bearings within the lower portion of the casing. The shaft can have an axial center line and an outer end protruding from a first end of the lower portion of the casing. A propeller can be attached to the outer end of the shaft outside the first end of the lower portion of the casing, and the propeller rotating with the shaft. An annular housing can be fixedly supported at the casing. The axial center line of the shaft can form an axial center line of the annular housing, and wherein the annular housing can surround an outer perimeter of the propeller and can form a duct for water flowing through the interior of the annular housing.

The propulsion unit can include a rim drive electric motor including a rotor rim and a stator. The rotor rim can be provided on the outer perimeter of the propeller and rotating with the propeller, and wherein the stator can be provided within the annular housing and surrounding the rotor rim.

The arrangement can use oil lubricated roller bearings as radial and axial bearings supporting the shaft within the casing. In accordance with an exemplary embodiment, the bearings are not in contact with seawater. The shaft protruding from the first end of the lower portion of the casing can be sealed so that seawater cannot penetrate into the casing. The sealing arrangement between the shaft and the casing can be used in known propulsion arrangements, for example, where the shaft protrudes from the casing. For example, in accordance with an exemplary embodiment, the same type of oil lubricated roller bearings used in known propulsion arrangements can be used in the disclosure. The oil lubrication can be realized by positioning a suitable oil container below each roller bearing so that the lower portion of the roller bearing can be within the oil layer. Oil lubrication can be provided during each revolution of the roller bearing.

In accordance with an exemplary embodiment, the electric motor situated in the casing can be substituted with a rim drive electric motor situated in the housing surrounding the propeller in the disclosed arrangement. For example, in accordance with an exemplary embodiment, the casing can include only the shaft as well as the radial and axial bearings supporting the shaft. It is thus only the radial and axial bearings, which can produce heat within the casing. The amount of heat produced within the casing can be smaller compared to an arrangement where the electric motor can be situated within the casing. The rather small amount of heat that can be produced by the bearings can be cooled through the shell of the casing directly to the seawater surrounding the casing. Thus, there is no use for special cooling arrangements within the casing.

In accordance with an exemplary embodiment, the lack of an electric motor producing heat within the casing can also have a beneficial impact on the life time of the sealing between the shaft and the casing. The sealing can be subjected to the heat produced by the radial bearing near the sealing, but not to the heat produced by the electric motor. In accordance with an exemplary embodiment, the operation temperature of the sealing can be lower, which can prolong the lifetime of the sealing.

The electric motor in the disclosed arrangement can be a rim drive electric motor, and wherein the rotor can be positioned on the outer perimeter of the propeller and the stator can be positioned within the housing surrounding the propeller. The diameter of the outer perimeter of the propeller and the diameter of the housing can be, for example, in the order of several meters, which can provide a large surface around the rotor and an even larger surface around the stator, and wherein both surfaces are in direct contact with seawater. The cooling of the rotor and the stator can be directly as a result of the seawater surrounding the rotor and the stator can be efficient, since there is no need for any special cooling arrangements for the rim drive electric motor.

A high torque can be achieved in the disclosed arrangement since the rim drive electric motor can have a greater diameter compared to an electric motor situated within the casing.

In accordance with an exemplary embodiment, the arrangement can be suitable to be used in the previously mentioned DP vessels. The thrust used in the DP vessels where the disclosure can be used, for example, can be in the range of 50 to 150 tons. The power of the electric motor in these applications can be in the order of megawatts. The diameter of the outer periphery of the propeller can be in the order of several meters.

The axial length of the casing and the housing in the disclosed arrangement can be smaller, for example, 40 to 50% smaller than the axial length of the casing and the housing in known propulsion arrangements having the electric motor within the casing. For example, in accordance with an exemplary embodiment, the dimensions of the service opening in the bottom of the vessel through which the casing and the housing can be mounted by lowering it downwards, and the service opening can be made smaller in a corresponding way.

The disclosure can also have an impact on the dimensioning of the shaft supporting the propeller. For example, in accordance with an exemplary embodiment, the shaft does not have to withstand torque as the toque produced by the electric motor can be directly transferred from the rotor rim positioned on the outer periphery of the propeller to the propeller. Thus, the shaft should be able to withstand bending forces and thrust forces produced by the propeller. Accordingly, a hollow shaft can be used in the disclosed arrangement. In accordance with an exemplary embodiment, cooling water can be directed through the hollow shaft in order to intensify cooling of the bearings and the sealing.

In accordance with an exemplary embodiment, to exemplify the dimensions of the propulsion unit one could refer to the known Azipod® arrangement for a DP vessel delivered by the applicant. The power of the electric motor positioned within the casing can be 4.5 MW, the torque of the electric motor can be about 200 kNm, the rotation speed of the electric motor can be 210 rpm, the diameter of the outer periphery of the propeller can be 3.5 m and the axial length of the total entity including the casing and the housing can be 6 m. For example, by using a 4.5 MW rim drive electric motor having the same torque, one can reduce the length of the total entity by about 50%. The diameter of the propeller can be increased due to the increased torque capacity of the electric motor. The increase of the diameter of the propeller can increase the thrust produced by the propeller. The length of the stator in the electric motor situated within the casing can be about 2.2 m and the length of the stator of the rim drive electric motor can be about 0.35 m. The increase in the diameter of the rim drive electric motor can result in that the mass of the motor is not reduced correspondingly. For example, the mass of the permanent magnets used in the electric motor can be reduced from about 1000 kg to about 400 kg in the rim drive electric motor. The operation efficiency of the frim drive electric motor can be about 97.8%.

FIG. 1 shows a known propulsion unit. The propeller can push the vessel forwards in a first direction S1. The propulsion unit 100 can include a casing 20, an electric motor 30, a shaft 31, a propeller 37, and an annular housing 40. The hollow casing 20 can include an upper portion 21 and a lower portion 22. The upper portion 21 of the casing 20 can form a curved support member for the casing 20. The casing 20 can be rotatably supported from the upper portion 21 at a hull 10 of a vessel. The casing 20 can thus be rotated 360 degrees around a vertical center axis Y in relation to the hull 10 of the vessel. The lower portion 22 of the casing 20 can have a first end 22A and a second opposite end 22B. The lower portion 22 of the casing 20 can form a longitudinal compartment having a torpedo-shape. The electric motor 30 can be situated within the lower portion 22 of the casing 20.

The electric motor 30 can be connected with a cable 35 to a generator situated within the vessel, the generator being driven by a diesel engine. A shaft 31 with an axial center line X can pass through the electric motor 30. The shaft 31 can be rotatably supported within bearings 32, 33 in the compartment in the lower portion 22 of the casing 20. A radial bearing 32 can be situated on one side of the electric motor 30 at the first end 22A of the lower portion 22 of the casing 20 and a combined radial/axial bearing 33 can be situated on the other opposite side of the electric motor 30 at the second end 22B of the lower portion 22 of the casing 20. The rotor of the electric motor 30 can be positioned on the shaft 31 and the stator of the electric motor 30 can surround the rotor. The diameter D1 of the electric motor 30 in the casing 20 can be in the order of 0.5 to 2 m. An increase in the diameter D1 of the electric motor 30 can increase the physical size of the casing 20 and can weaken the hydrodynamic properties of the casing 20. An outer end 31A of the shaft 31 can protrude from an opening at the first end 22B of the lower portion 22 of the casing 20. The shaft 31 can be sealed with a sealing 34 at the first end 22A of the lower portion 22 of the casing 20 such that water cannot penetrate into the casing 20 along the shaft 31. A hub 36 can be attached to the outer end 31A of the shaft 31 outside the first end 22A of the lower portion 22 of the casing 20 and a propeller 37 can be attached to the hub 36.

An annular housing 40 can surround the outer perimeter of the propeller 37. The annular housing 40 can be attached to the upper portion 21 of the casing 20 and to a vane 23 extending downwards from the lower portion 22 of the casing 20. In accordance with an exemplary embodiment, several or a plurality of vanes 23 can support the annular housing 40 at the casing 20. The annular housing 40 can form a central duct 45 with an axial flow path for water from a first end 41 to a second end 42 of the annular housing 40. The electric motor 30 can drive the propeller 37 via the shaft 31. The axial center line X of the shaft 31 can also form the axial center line of the housing 40. The total length L1 of the casing 20 and the annular housing 40 in the axial direction can be relatively large in the known propulsion arrangement. The inner surface of the annular housing 40 can form a cylinder having an axial center axis coinciding with the axial center axis X of the shaft 31. The rotating propeller 37 can cause water to flow through the central duct 45 from the first end 41 of the central duct 45 to the second end 42 of the central duct 45 in a second direction S2, which can be opposed to the first direction S1.

A first radial plane Y1 passing through an axial middle point of the rotor 51 can be situated outside the first end 22A of the lower portion 22 of the casing 20. The first radial plane Y1 passing through the axial middle point of the rotor 51 and a second radial plane Y2 passing through an axial middle point between the bearings 32, 33 are thus at an axial distance A1 from each other. The rotor 51 can have a width in the axial direction and the axial middle point of the rotor 51 can be in the middle of the width. The bearings 32, 33 can be positioned at a distance from each other in the axial direction. The axial middle point between the bearings 32, 33 can be in the middle of the distance.

The radial bearing 32 near the outer end 31A of the shaft 31 can be a roller bearing and the combined radial/axial bearing 33 at the opposite inner end 31B of the shaft 31 can also be a roller bearing. The combined radial/axial bearing 33 can support the shaft 31 against radial movement and axial movement. The rotating propeller 37 can produce a thrust, which can produce an axial force along the shaft 31. The combined radial/axial bearing 33 can transfer this axial force into the casing 20 and the casing 20 can transfer it further to the hull 10 of the vessel. The thrust produced by the propeller 37 can be amplified by the housing 40 at low speeds. The situation can be such that the propeller 37 can produce 60% of the total thrust and the housing 40 can produce 40% of the total thrust at low speeds. The housing 40 can form a kind of a nozzle and can be used in propulsion units of Dynamic Positioning (DP) vessels used in oil drilling. There can be several propulsion units in such vessels and the vessel can be kept steady in position by the propulsion units. In accordance with an exemplary embodiment, a big thrust can be used at low speed in order to keep the vessel continuously in position, for example, in rough seas.

Figure 2:
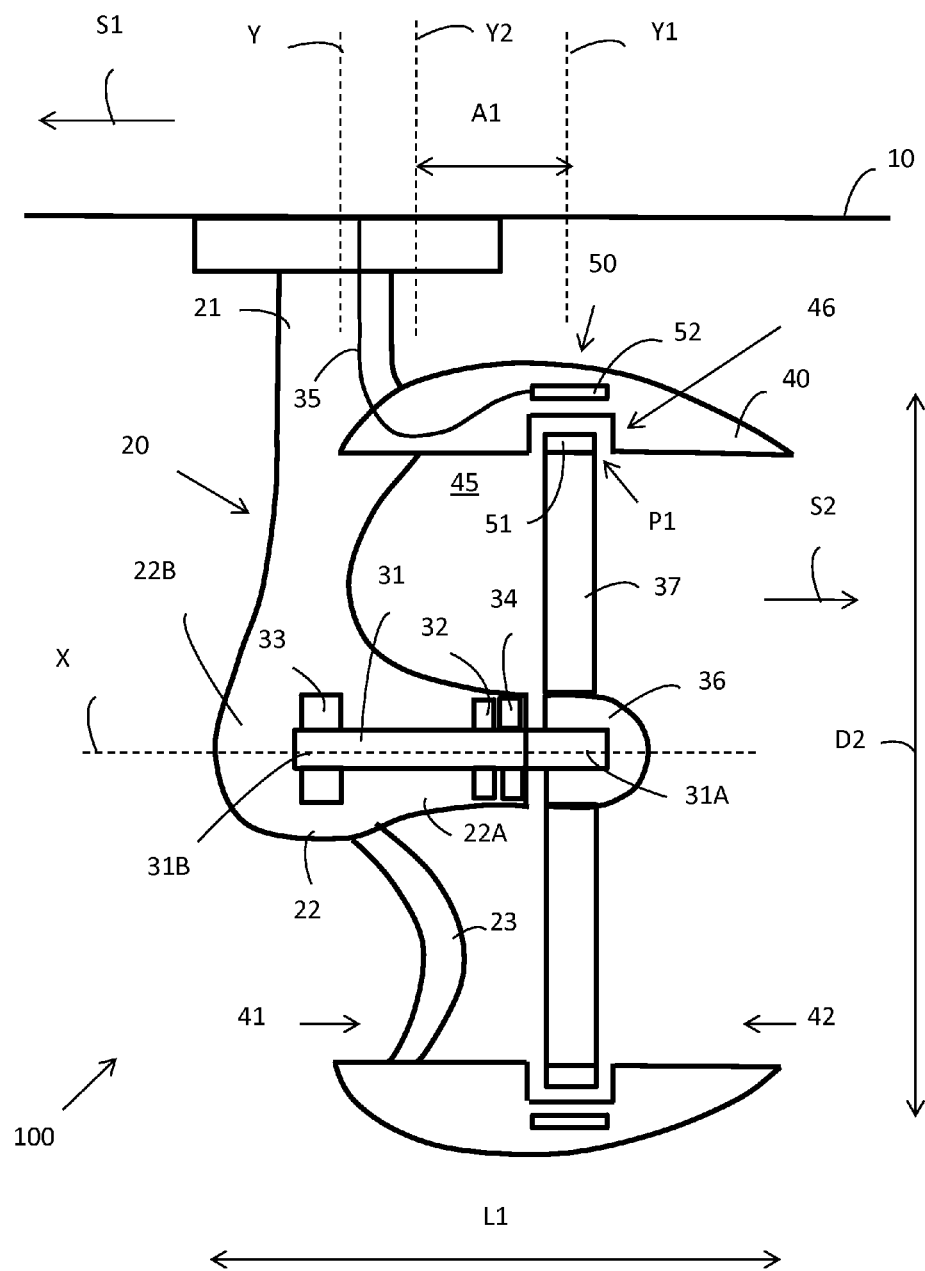
FIG. 2 shows an exemplary embodiment of a propulsion unit according to the disclosure.

FIG. 2 shows an exemplary embodiment of a propulsion unit according to the disclosure. The propeller as shown in FIG. 2 is pushing the vessel forwards in the first direction S1. The propulsion unit 100 in the exemplary embodiment can include a casing 20, an electric motor 50, a shaft 31, a propeller 37, and an annular housing 40. The hollow casing 20 can include an upper portion 21 and a lower portion 22. The upper portion 21 of the casing 20 can form a curved support member for the casing 20. The casing 20 can be rotatably supported from the upper portion 21 at a hull 10 of a vessel. The casing 20 can thus be rotated 360 degrees around a vertical center axis Y in relation to the hull 10 of the vessel. The lower portion 22 of the casing 20 can have a first end 22A and a second opposite end 22B. The lower portion 22 of the casing 20 can form a longitudinal compartment for the shaft 31 and the bearings 32, 33.

The electric motor 30 positioned in the casing 20 in FIG. 1 has been substituted by a rim drive electric motor 50 positioned in the housing 40. A shaft 31 with an axial center line X can be rotatably supported in the compartment in the lower portion 22 of the casing 20 with a radial bearing 32 and with a combined radial/axial bearing 33. An outer end 31A of the shaft 31 can protrude from an opening at the first end 22A of lower portion 22 of the casing 20. A hub 36 can be attached to the outer end 31A of the shaft 31 outside the first end 22A of the lower portion 22 of the casing 20 and a propeller 37 can be attached to the hub 36.

An annular housing 40 can be supported at the casing 20. The annular housing 40 can be supported directly at the upper portion 21 of the casing 20 and through a vane 23 at the lower portion 22 of the casing 20. The annular housing 40 can surround an outer perimeter of the propeller 37 and can form a central duct 45 with an axial flow path for water from a first end 41 to a second end 42 of the annular housing 40. The propeller 37 can be driven by a rim drive electric motor 50. The rime drive electric motor 50 can be an induction motor including a rotor rim 51 and a stator 52. The rotor rim 51 can be provided on the outer perimeter of the propeller 37, for example, on the outer tips of the propeller 37 blades and can rotate with the propeller 37. The stator 52 can be mounted within the annular housing 40 and can surround the rotor rim 51. The rotor rim 51 can include permanent magnets and can form a permanent magnet rotor.

A first radial plane Y1 passing through an axial middle point of the rotor 51 can be situated outside the first end 22A of the lower portion 22 of the casing 20. The first radial plane Y1 passing through the axial middle point of the rotor 51 and a second radial plane Y2 passing through an axial middle point between the bearings 32, 33 can be thus at an axial distance A1 from each other. The rotor 51 can have a width in the axial direction and the axial middle point of the rotor 51 can be in the middle of the width. The bearings 32, 33 can be positioned at a distance from each other in the axial direction. The axial middle point between the bearings 32, 33 can be in the middle of the distance.

The electric power used in the rim drive electric motor 50 can be produced within the hull 10 of the ship. The electric power can be produced by a generator connected to a diesel engine. The electric power to the stator 52 of the rim drive electric motor 50 can be supplied by cables 35 running from the generator within the interior of the hull 10 of the vessel through the casing 20 and further to the stator 52 within the annular housing 40.

At least the first end 22A of the lower portion 22 of the casing 20 can be situated within the annular housing 40. The rotating propeller 37 can cause water to flow through the central duct 45 from the first end 41 of the central duct 45 to the second end 42 of the central duct 45 in the second direction S2, which can be opposite to the first direction S1. The water flow can pass thus along the outer surface of the casing 20 before entering into the central duct 45. The casing 20 and the annular housing 40 can have a smooth form in order to allow water to pass smoothly along the surfaces of the equipment. The upper portion 21 of the casing 20 can be situated at an axial distance from the propeller 37, such that the casing 20 does not significantly disturb the flow of water to the propeller 37. The water flow can have time to stabilize after passing the casing 20 and before entering the propeller 37. The second direction S2 can run along the central axis X of the shaft 31.

The casing 20 shown in FIG. 2 can be made shorter in the axial direction compared to the casing 20 in FIG. 1. This can be due to the fact that the electric motor 50 driving the propeller 37 can be transferred from the casing 20 to the housing 40. The bearings 32, 33 supporting the shaft 31 within the compartment at the lower portion 22 of the casing 20 can be oil lubricated roller bearings 32, 33. A lower portion of the roller bearings 32, 33 can be positioned in oil, which can provide lubrication during the revolution of the bearings 32, 33. Thus, there is no need for making special arrangements for lubrication of the bearings 32, 33. The heat generated by the bearings 32, 33 can warm the air within the casing 20 and this warm air within the casing 20 can be cooled when it passes along the inner surfaces of the shell of the casing 20. The outer surface of the shell of the casing 20 can be in direct contact with the surrounding seawater and can be cooled by the seawater passing along the outer surface of the shell of the casing 20.

The sealing 34 sealing the shaft 31 at the first end 22A of the lower portion 22 of the casing 20 where the outer end 31A of the shaft 31 can protrude from the first end 22A of the lower portion 22 of the casing 20 can be externally heated by the heat produced by the bearings 32, 33. For example, it is mainly the radial bearing 32 situated adjacent to the sealing 34 that can produce external heat to the sealing 34. For example, there is no electric motor within the lower portion 22 of the casing 20, which would cause additional external heating of the sealing 34. In addition, the operating temperature of the sealing 34 can remain at a lower level prolonging the lifetime of the sealing 34.

The rim drive electric motor 50 can generate a high torque, which can be beneficial in propulsion applications. The high torque can be due to the diameter D2 of the rotor 51 in the rim drive electric motor 50. The torque of an electric motor can be proportional to the volume of the electric motor. The volume of the rim drive electric motor 50 can be increased by the diameter D2 of the rim drive electric motor 50. In accordance with an exemplary embodiment, the diameter D2 of the rim drive electric motor 50 in FIG. 2 can be 2 to 6 times the diameter D1 of the electric motor 30 in FIG. 1. A rim drive electric motor 50 can be designed so that sufficient cooling of the stator 52 directly to the surrounding seawater can be achieved. In addition, the rotor 51 of the rim drive electric motor 50 can be cooled directly to the surrounding seawater. The rotor 51 can rotate in an annular grove 46 formed in the inner surface of the housing 40. A passage P1 can be arranged in the annular grove 46 between the rotor 51 and the stator 52 allowing seawater to pass through the passage P1 when sea water is passing through the central duct 45. The seawater flowing in the passage P1 can cool both the rotor 51 and the stator 52. The stator 52 of the rim drive electric motor 50 can also be cooled by seawater passing on the outer surface of the annular housing 40. The outer surface of the housing 40 can be relatively large due to the large diameter of the housing 40 and can form a large cooling surface for the stator 52, and wherein the large cooling surface can be in direct contact with seawater. The cooling of the rotor 52 can be arranged as a passive cooling directly through the shell of the housing 40 to the seawater surrounding the shell of the housing 40.

Figure 3:
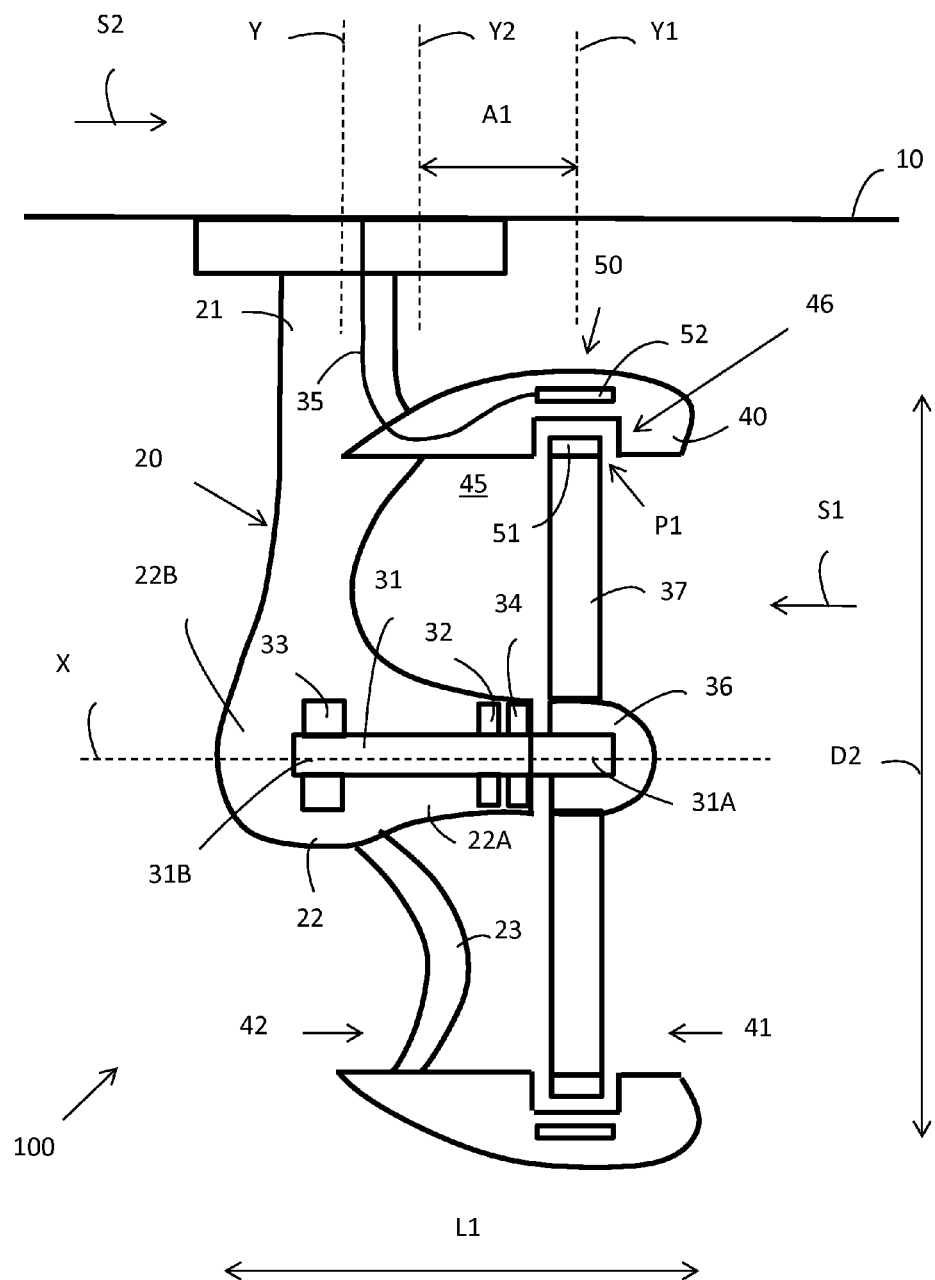
FIG. 3 shows an exemplary embodiment of a propulsion unit according to the disclosure.

FIG. 3 shows an exemplary embodiment of a propulsion unit according to the disclosure. The propeller as shown in FIG. 3 is pulling the vessel forwards in the second direction S2.

The exemplary embodiment of the propulsion unit 100 as shown in FIG. 3 corresponds to the exemplary embodiment of the propulsion unit 100 shown in FIG. 2 except for the propeller 37 and the housing 40. The propeller 37 in the exemplary embodiment as shown in FIG. 3 is working in an opposite direction S1 compared to the working direction S2 of the propeller 37 in the exemplary embodiment shown in FIG. 2. The direction of the housing 40 in this exemplary embodiment is turned 180 degrees compared to the direction of the housing 40 in the exemplary embodiment in FIG. 2. At least the first end 22A of the lower portion 22 of the casing 20 is also in this exemplary embodiment situated within the annular housing 40. The rotating propeller 37 can cause water to flow through the central duct 45 from the first end 41 of the central duct 45 to the second end 42 of the central duct 45 in the first direction S1. The water can flow freely into the central duct 45 and can pass along the outer surface of the casing 20 when leaving the central duct 45. The casing 20 and the annular housing 40 can have a smooth form as in the embodiment in FIG. 1 in order to allow water to pass smoothly along the surfaces of the equipment. The upper portion 21 of the casing 20 can be situated at an axial distance from the propeller 37, such that the casing 20 does not significantly disturb the flow of water ejected from the propeller 37.

The casing 20 can be rotated 360 degrees around a vertical central axis Y in relation to the hull 10 of the vessel. The shaft 31 can rotate around a horizontal central axis X. The angle between the swivel axis Y of the casing 20 and the swivel axis X of the shaft 31 is thus 90 degrees in the figures. The swivel axis X of the shaft 31 can be inclined in relation to the horizontal plane. An inclined swivel axis X of the shaft 31 can result in hydrodynamic advantages. An inclined swivel axis X of the shaft 31 can be achieved by tilting the whole casing 20 in relation to the hull 10 of the vessel.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A propulsion unit comprising:
   a hollow casing including an upper portion and a lower portion, the hollow casing being configured to be rotatably supported from the upper portion at a hull of a vessel, the lower portion of the hollow casing forming a longitudinal compartment;
   a shaft rotatably supported with radial and axial oil lubricated roller bearings within the lower portion of the hollow casing, the shaft having an axial center line and an outer end protruding from a first end of the lower portion of the hollow casing, the outer end of the shaft being sealed with a sealing to the first end of the lower portion of the hollow casing in order to prevent water from penetrating into the hollow casing;
   a propeller attached to the outer end of the shaft outside the first end of the lower portion of the hollow casing, and wherein the propeller is configured to rotate with the shaft;
   a nozzle attached to and fixedly supported at the hollow casing, the axial center line of the shaft forming an axial center line of the nozzle, the nozzle surrounding an outer perimeter of the propeller and forming a duct for water to flow through an interior of the nozzle, the longitudinal compartment of the lower portion of the hollow casing containing the shaft, the shaft being rotatable about the axial center line relative to the bearings and the lower portion of the hollow casing; and
   a rim drive electric motor including a rotor rim and a stator, the rotor rim being provided on the outer perimeter of the propeller for rotation with the propeller, and wherein the stator is provided within the nozzle and surrounding the rotor rim,
   a first radial plane passing through an axial middle point of the rotor rim, said first radial plane being situated outside the first end of the lower portion of the hollow casing,
   a second radial plane passing through an axial middle point between the bearings, whereby the first radial plane and the second radial plane are at an axial distance from each other.

2. A propulsion unit according to claim 1, wherein an inner surface of the nozzle includes an annular groove, and wherein the rotor rim is configured to rotate within the annular groove.

3. A propulsion unit according to claim 2, comprising:
   a passage between the rotor rim and the nozzle in the groove, and configured such that water can pass through the passage in order to cool the rotor rim and the stator.

4. A propulsion unit according to claim 1, wherein the duct passing through the interior of the nozzle is cylindrical.

5. A propulsion unit according to claim 1, wherein at least the first end of the lower portion of the hollow casing is situated within the nozzle.

6. A propulsion unit according to claim 1, wherein the rotor rim is a permanent magnet rotor.

7. A propulsion unit according to claim 1, wherein the stator is arranged for passive cooling directly through a shell of the nozzle when seawater surrounds the shell of the nozzle.

* * * * *